United States Patent
O'Connor et al.

(10) Patent No.: US 7,406,612 B2
(45) Date of Patent: Jul. 29, 2008

(54) INFORMATION HANDLING SYSTEM INCLUDING STANDBY/WAKEUP FEATURE DEPENDENT ON SENSED CONDITIONS

(75) Inventors: Clint O'Connor, Austin, TX (US); Roy W. Stedman, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 804 days.

(21) Appl. No.: 10/719,275

(22) Filed: Nov. 21, 2003

(65) Prior Publication Data

US 2005/0114641 A1 May 26, 2005

(51) Int. Cl.
G06F 1/26 (2006.01)
(52) U.S. Cl. .................. 713/320; 713/300; 713/323; 713/324
(58) Field of Classification Search .................. 713/1, 713/300, 320, 323, 324; 345/418
See application file for complete search history.

(56) References Cited

U.S. PATENT DOCUMENTS

| | | | | |
|---|---|---|---|---|
| 5,303,171 | A * | 4/1994 | Belt et al. | 713/321 |
| 6,044,473 | A * | 3/2000 | Kim | 713/320 |
| 6,317,614 | B1 * | 11/2001 | Okada | 455/574 |
| 6,418,536 | B1 * | 7/2002 | Park | 713/323 |
| 6,546,472 | B2 | 4/2003 | Atkinson et al. | |
| 6,553,400 | B1 | 4/2003 | Fukuda | |
| 6,782,471 | B2 * | 8/2004 | Barrett | 713/1 |
| 2001/0020940 | A1 * | 9/2001 | Nakazato et al. | 345/418 |
| 2003/0210221 | A1 * | 11/2003 | Aleksic | 345/102 |
| 2004/0243324 | A1 * | 12/2004 | Nunokawa et al. | 702/63 |
| 2006/0190750 | A1 * | 8/2006 | Maggi et al. | 713/320 |

OTHER PUBLICATIONS

Karagiannis, Konstantinos, "HP Compaq Tablet PC TC1000", PC Magazine, Dec. 3, 2002.
"Intel Low Power Technologies for Mobile PCs", www.intel.com/mobile/resources/downloads/pdf/LowPower.PDF.
"Application Power Management for Mobility", Intel Corporation, Mar. 20, 2002.
"Is Wacom slowing down tablet innovation?", Tabula PC, Sep. 22, 2003.
Versa LitePad / Tablet PC User's Guide, NEC Solutions America, Jan. 2003.
Bennett, Jonathan, "ViewSonic Tablet PC V1100", ZDNet's, Nov. 7, 2002.
"Windows Power Management: Instant PC Availability and Energy Savings", Microsoft, Dec. 4, 2001.

* cited by examiner

Primary Examiner—Thomas Lee
Assistant Examiner—Malcolm D Cribbs
(74) Attorney, Agent, or Firm—Haynes and Boone, LLP

(57) ABSTRACT

A portable information handling system is provided that monitors one or more sensed conditions to determine if the system is currently placed in an unusable state. If the system determines that it has been placed in an unusable state such as being placed in the dark or upside down, then a reduced power mode is entered. Significant power savings are thus achieved because the system consumes power at a substantially reduced rate when it is determined to be in an unusable state.

7 Claims, 4 Drawing Sheets

INFORMATION HANDLING SYSTEM INCLUDING STANDBY/WAKEUP FEATURE DEPENDENT ON SENSED CONDITIONS

BACKGROUND

The disclosures herein relate generally to information handling systems (IHS's) and more particularly to power management in portable IHS's.

As the value and use of information continue to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An important design goal for battery-powered portable IHS's is to make the batteries last as long as possible. This is especially important as the IHS becomes more compact, such as the case with tablet systems and other small IHS's where space for batteries is at a premium. In tablet systems, conventional power management allows the system to enter a low power standby state after a predetermined amount of time has passed since the last time the user provided input to the system. While significant power savings are possible with this timeout feature, further reductions in power consumption are still very desirable.

What is needed is a way to decrease the amount of power that a portable IHS consumes so that battery life can be increased.

SUMMARY

Accordingly, in one embodiment, a method is disclosed for operating a portable information handling system (IHS). The method includes sensing a condition to which the IHS is subjected in the course of operation to provide sensed information. The method also includes analyzing the sensed information to determine if the IHS is currently in an unusable state. The method still further includes the IHS entering a reduced power mode if it is found that the IHS is currently in an unusable state.

In another embodiment, a portable information handling system (IHS) is disclosed which includes a processor and a memory coupled to the processor. The IHS also includes a condition sensor, coupled to the processor, for sensing a condition to which the IHS is subjected in the course of operation to provide sensed information. The IHS further includes nonvolatile storage, coupled to the processor, for storing control software for analyzing the sensed information to determine if the IHS is currently in an unusable state. The control software causes the IHS to enter a reduced power mode if it is found that the IHS is currently in an unusable state.

A principal advantage of the embodiments disclosed herein is the reduction of power consumed by portable IHS's which would otherwise continue to draw substantial amounts of power from their power sources even though they have encountered conditions rendering them unusable.

DETAILED DESCRIPTION

Figure 1C:
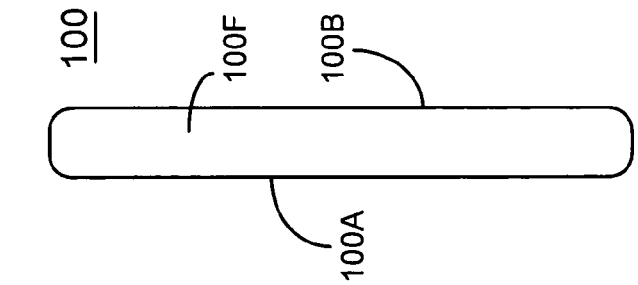
FIG. 1A-1C are plan views of the disclosed information handling system (IHS).
Figure 1A:
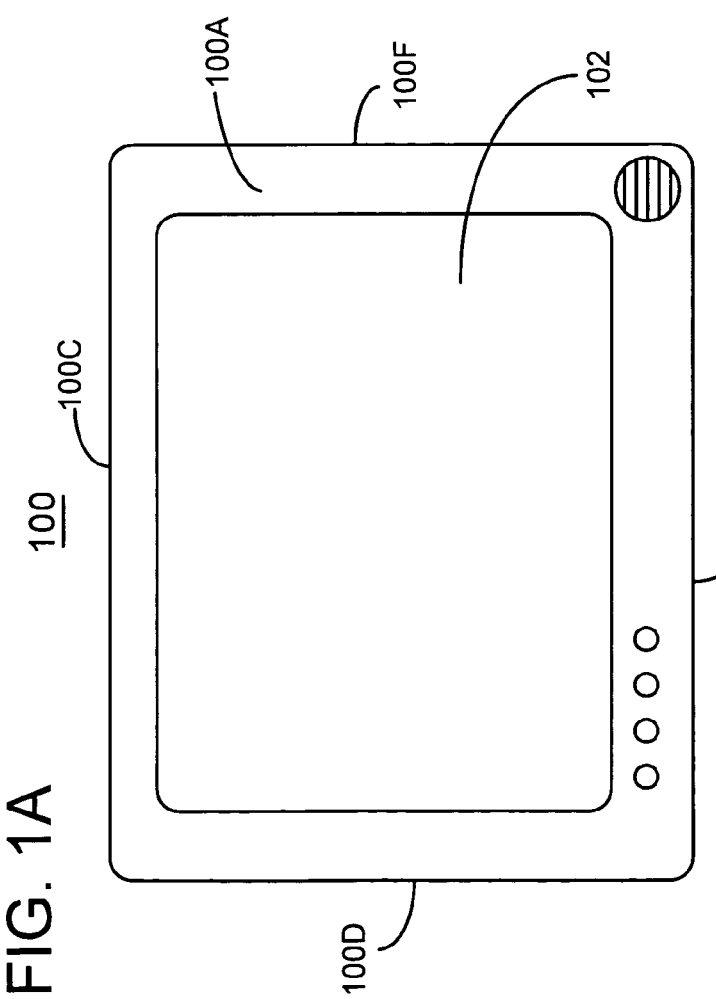
Figure 1B:
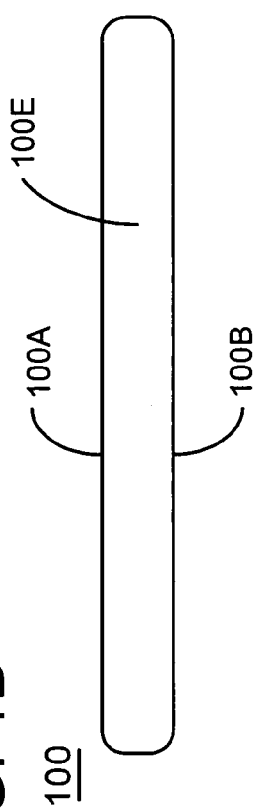

FIGS. 1A-1C are plan views of the disclosed portable information handling system 100. For purposes of this disclosure, an information handling system (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Tablet and other portable handheld information handling systems typically have a display situated on one of the surfaces of the system. As seen in the top plan view of IHS 100 in FIG. 1A, IHS 100 includes a display 102 situated on upper surface 100A. FIGS. 1B and 1C are respective side plan views of IHS 100. Top surface 100A and opposed bottom surface 100B are both visible in FIGS. 1B and 1C. In FIG. 1B IHS 100 is in the display up position in which the IHS is normally used. IHS 100 includes side surfaces 100C, 100D, 100E and 100F as shown in FIG. 1A. Displays such as display 105 typically consume a substantial amount of power when activated.

Many operational scenarios exist where a tablet system is not being used and yet the system remains powered up drawing energy from its energy source. For example, when a tablet is placed with the display positioned face down on a desk, it is unusable in that position. With the display upside down on a desk, the user can not see the display. However, if the user is lying down and holding the IHS above him or her body, the tablet system is in a usable state, although this would not be the normal operating position for most users. When the user places the tablet in a briefcase it is again unusable. In that case, the tablet is surrounded by darkness and the user can not see the tablet. It is also possible that while being moved from place to place the system is not usable due to motion. It can be difficult although not impossible to view a moving display and touch screen icons when you walk with a tablet from place to place.

While the timeout feature mentioned earlier will eventually get around to powering the system down to a standby state if the system is not being used, additional techniques for reducing power consumption are still very desirable. The disclosed technology identifies several scenarios wherein the portable tablet system or IHS is defined to be not usable and during these times the tablet system enters a reduced power standby mode to conserve energy. Sensors are used to detect a number of conditions described later which a tablet system may encounter during the course of its operation. The tablet system analyzes the sensed conditions and makes a determination as to whether or not the tablet system is currently in an unusable state for which it will be powered down into a standby mode. The disclosed system allows the user to select those factors which determine whether or not particular conditions are regarded as placing the system in an unusable state for which power reduction is desired. In one embodiment, the sensed conditions are external conditions, namely conditions to which the IHS is subjected, as opposed to conditions internal to the IHS.

Figure 2:
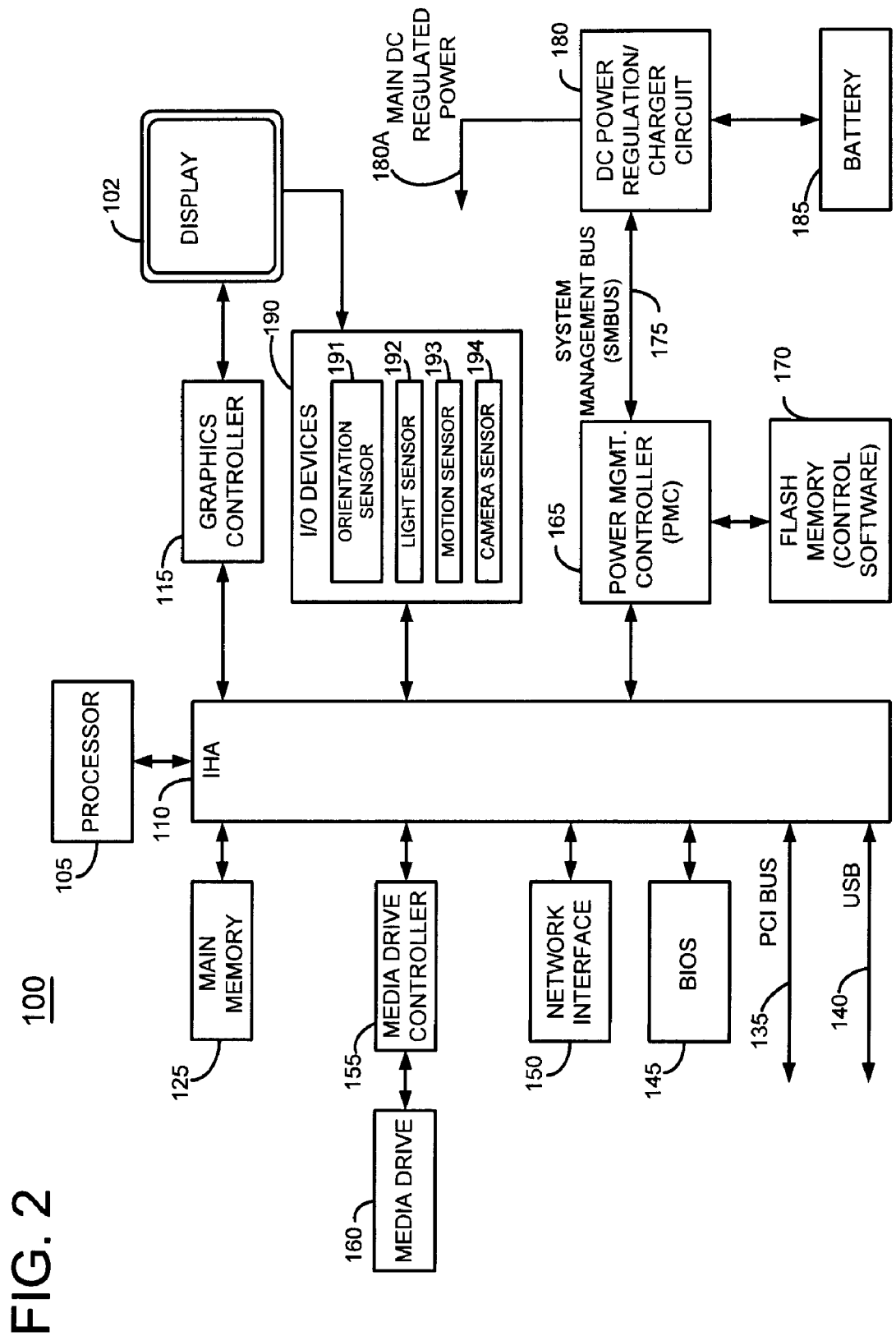
FIG. 2 is block diagram of the IHS of FIG. 1.

FIG. 2 is a block diagram of the portable IHS 100 in which the disclosed technology is employed. IHS 100 includes a processor 105 such as an Intel Pentium series processor or one of many other processors currently available. An Intel Hub Architecture (IHA) chipset 110 provides IHS 100 with gluelogic that connects processor 105 to other components of IHS 100. Chipset 110 carries out graphics/memory controller hub functions and I/O functions. More specifically, chipset 110 acts as a host controller which communicates with a graphics controller 115 coupled thereto. Graphics controller 115 is coupled to a display 102. Chipset 110 also acts as a controller for main memory 125 which is coupled thereto. An expansion bus 135, such as a Peripheral Component Interconnect (PCI) bus, PCI Express bus, SATA bus or other bus is coupled to chipset 110 as shown to enable IHS 100 to be connected to other devices which provide IHS 100 with additional functionality. A universal serial bus (USB) 140 or other I/O bus is coupled to chipset 110 to facilitate the connection of peripheral devices to IHS 100. System basic input-output system (BIOS) 145 is coupled to chipset 110 as shown. BIOS software 145 is stored in nonvolatile memory such as CMOS or FLASH memory. A network interface controller (NIC) 150 is coupled to chipset 110 to facilitate connection of system 100 to other information handling systems. A media drive controller 155 is coupled to chipset 110 so that devices such as media drive 160 can be connected to chipset 110 and processor 105. Devices that can be coupled to media drive controller 155 include CD-ROM drives, DVD drives, hard disk drives and other fixed or removable media drives. IHS 100 includes an operating system which is stored on media drive 160. Typical operating systems which can be stored on media drive 160 include Microsoft Windows XP Tablet PC Edition. (Microsoft and Windows are trademarks of Microsoft Corporation.)

IHS 100 includes a power management controller (PMC) 165 which is coupled to chipset 110 as shown. PMC 165 controls power supply functions within IHS 100 under the direction of control software stored in nonvolatile FLASH memory 170. One output of PMC 165 is a system management bus (SMBUS) 175 which is coupled to DC power regulator/charger circuit 180. A battery 185 is coupled to regulator/charger circuit 180 to provide IHS 100 with a source of power. Regulator/charger circuit 180 includes an output 180A which provides the main DC regulated power for the components of the IHS.

Chipset 110 further acts as an I/O controller hub (ICH) which performs I/O functions. In one embodiment display 100 is touch sensitive to permit the user to provide input to IHS 100. In that embodiment, display 102 is coupled to chipset 110 as an I/O device, for example as a pointing device. In another embodiment, a separate touchpad is used as a pointing device among I/O devices 190. As mentioned earlier, IHS100 includes sensors for detecting conditions which enable a determination to be made as to whether or not the IHS is currently in an unusable state. An observed state can be found to be an unusable state at the user's option as discussed later in more detail with reference to the flowchart of FIG. 3 When the IHS is found to be in such an unusable state, control software such as BIOS software 145 causes IHS 100 to enter a reduced power or standby mode. Reduced power modes include standby, hibernation, suspend to memory, suspend to disk and other modes wherein the IHS operates at less then full power to reduce energy consumption.

In one embodiment, a spatial orientation sensor 191 is included among I/O devices 190 to enable IHS 100 to determine if its display 102 is facing upward (the typical "in use" position) or if it is in some other orientation. In one embodiment, if display 102 is found to be facing down, then it is determined that the IHS is in an unusable state and power reduction mode is entered. In another embodiment, a light sensor is also included among I/O devices 190 to enable IHS 100 to determine if it is currently located in a lighted area. If IHS 100 is determined to be the dark, eg. in a dark room or inside a briefcase, this may indicate an unusable state for which the reduced power mode is entered. The user can so elect as discussed later. In another embodiment, IHS 100 includes a motion sensor 193 to detect when the system is in motion, namely being moved from place to place. An accelerometer or camera can be used as such a motion sensor. If the user desires, when the motion sensor detects motion, or motion greater than a selected rate, then the IHS is treated as being in an unusable state and the IHS enters the power reduction mode. A camera 194 can be employed as a sensor which senses a multiple conditions. The camera can sense light/darkness and motion, for example.

In one embodiment, the detection of a single sensed condition is sufficient to find that the IHS is in an unusable state and eligible for power reduction mode. For example, the user may elect that whenever the IHS is found to be in the dark that it enters the power reduction mode. In another embodiment, the user may choose that a combination of sensed conditions is required for a finding that the IHS is in an unusable state and thus eligible for power reduction mode. For example, IHS 100 is configured so that the user can elect that both darkness and an upside down orientation must be sensed before finding that IHS 100 is in an unusable state and eligible for power reduction.

Figure 3:
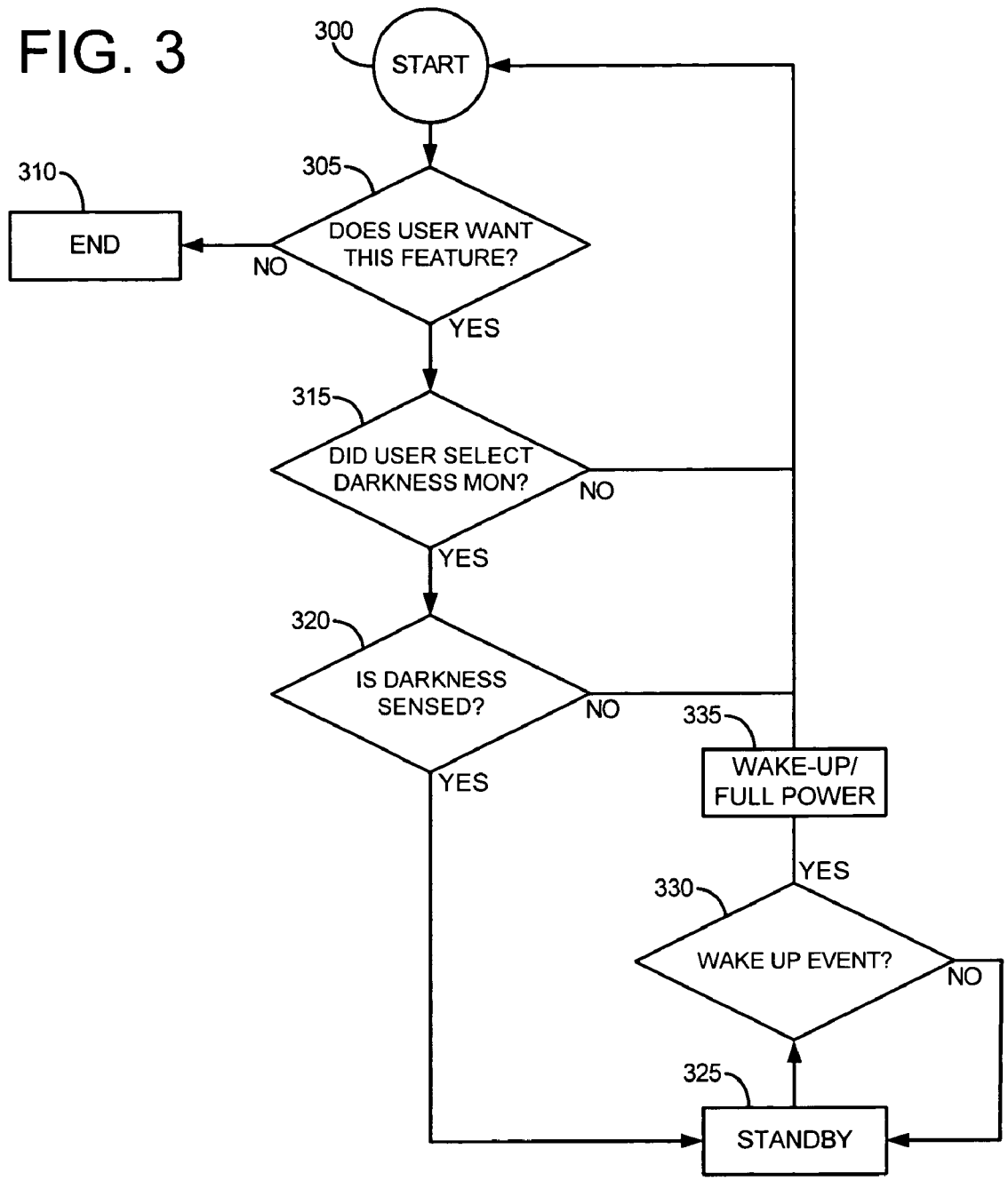
FIG. 3 is a flowchart showing the process flow of the IHS of FIG. 1.

It is possible that hardware circuitry can sense such conditions and make a determination as to whether or not the power reduction mode should be entered. However, in the preferred embodiment depicted in FIG. 2, control software in BIOS 145 receives sensed condition information from sensors 191-194 included in I/O devices 190 and makes a determination as to whether or not an unusable state exists for which reduced power mode should be commenced. FIG. 3 is a flowchart which depicts process flow of the control software implemented in BIOS 145. In this particular embodiment, the user has elected that the presence of a single condition, such as darkness for example, will be regarded as being sufficient information to determine that the system is in an unusable state and that the system should enter the power reduced mode.

Process flow commences at start block 300. A determination is then made at decision block 305 as to whether or not the user desires to use the disclosed unusable state power reduction feature. The user can elect to use this feature by a positive indication on a control panel or by making the election in a BIOS set up screen. If the user has elected not to use the feature, then process flow continues to end block 310 and the system continues with its normal operations. However, if the user has elected the feature, then process flow continues to decision block 315 at which a determination is made as to whether or not the user elected to use darkness as a sensed condition to determine if an unusable state has been encountered. If the user did not elect darkness as a condition for determining an unusable state, then process flow continues back to start block 300. However, if the user did elect to use darkness as the condition for a determination as to whether or not the system has entered an unusable state, then a determination is made at decision block 320 as to whether the system has encountered a darkness condition. To do this the system checks the output of light sensor 192 and/or camera sensor 194 to determine if the ambient light is less than a predetermined threshold value. If darkness is encountered as determined by the ambient light level being less than a predetermined threshold value then the system is found to be in an unusable state and the system enters a reduced power mode as per block 325. However, if darkness is not found, then process flow continues back to start block 300. Once the system enters the reduced power or standby state at block 325, the system monitors for a wake up event such as the return to a lighted condition as determined by again monitoring light sensor 192 and/or camera sensor 194. If a wake up event is encountered at decision block 330, then the system wakes up and commences full power operation as per block 335 and process flow continues back to start block 300. The system then again starts monitoring for a sensed condition which indicates that the system has encountered an unusable state.

While in the embodiment described above, the system is monitoring for a dark sensed condition to determine whether the system has encountered an unusable state, it is possible that the user could select other sensed conditions as indicating an unusable state. For example, rather than darkness, the user may elect that, whenever the display of the system is oriented face down, the system is regarded as having encountered an unusable state. To make this determination, rather than checking light sensor 192, the system checks orientation sensor 191 to see if the display of the system is oriented face down. If the display is found to be oriented face down, then the system is regarded as having encountered an unusable state and the system enters a reduced power mode such as indicated by block 325 in the flowchart of FIG. 3. One user may elect the display face down position as being an unusable state whereas another user may choose to operate the system in that orientation. In a similar manner to that already discussed above, the user can elect the presence of system motion as being the sensed condition which determines if the system is in an unusable state. The sensed conditions presented above are representative of the sensed conditions which may be elected to determine whether or not a system is in an unusable state. Other sensed conditions may be detected as well in other embodiments.

Figure 4:
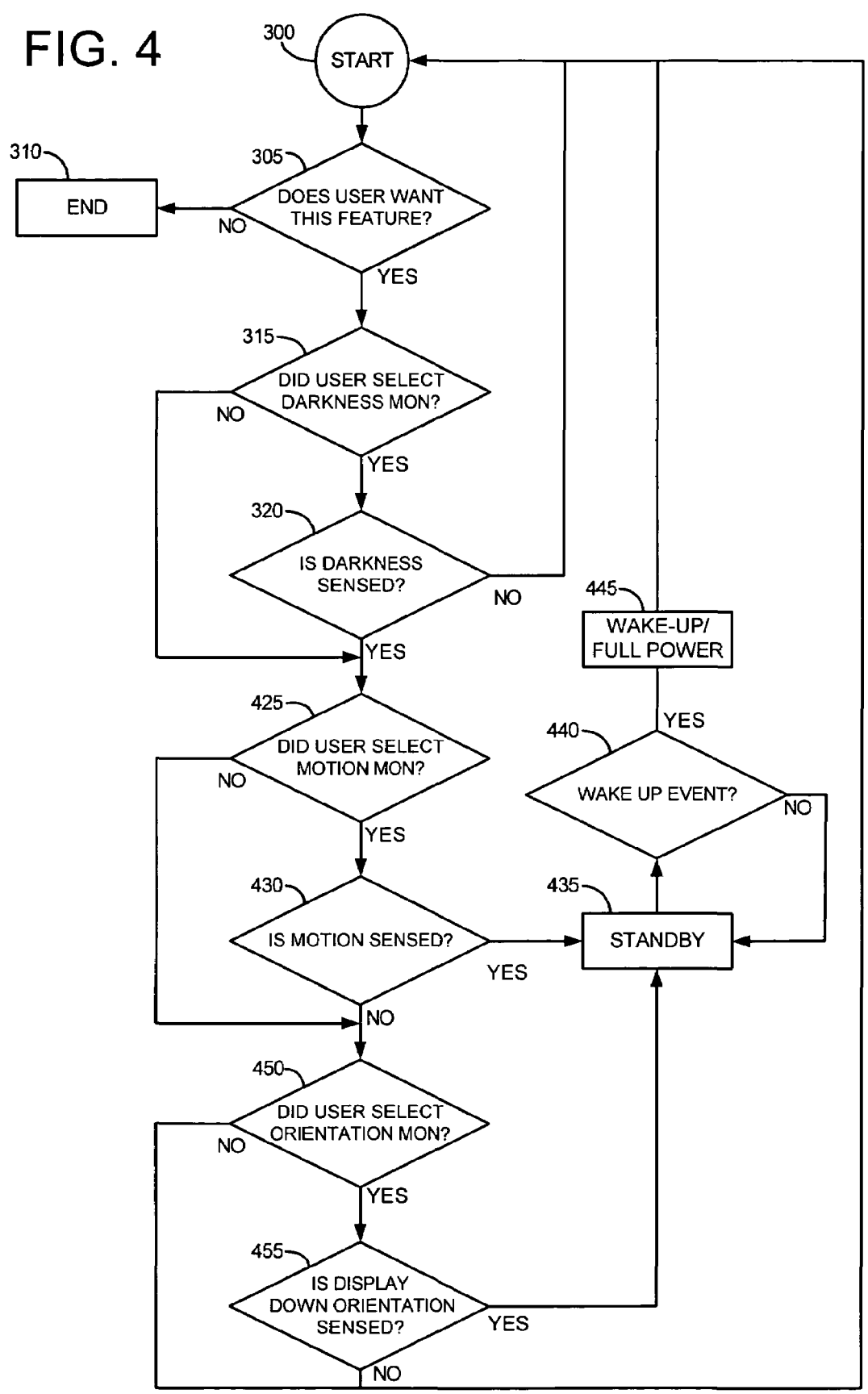
FIG. 4 is a flowchart showing the process flow another embodiment of the IHS.

It is also possible for the user to elect that multiple sensed conditions be present before the system is determined to be in an unusable state. FIG. 4 is a flowchart illustrating such an embodiment. Block 300-320 are the same as blocks 300-320 of the flowchart of FIG. 3, except that once decision block 320 determines the presence of a first sensed condition, namely darkness in this example, additional analysis is performed to determine if other sensed conditions are present as well.

After a first sensed condition is determined at decision block 320, a test is performed to see if the user selected a second sensed condition to be tested. More particularly, at decision block 425 a test is conducted to see if the user selected system motion as a second sensed condition to be checked. If the user previously selected motion as a sensed condition, then another test is performed at decision block 430 to determine if the system is currently in motion and if that motion exceeds a predetermined amount of motion. The system reads motion sensor 193 to see if the system is being moved and, if so, the system enters a reduced power mode or standby mode at block 435. The system then checks for a wake up event at decision block 440. If no wake up event is detected at decision block 440 then decision block 440 continues checking for a wake up event until one occurs. A wake up event may be the return of one sensed condition to a normal state. For example, light sensor 192 can change to indicate that the system is now back in the light. A wakeup event could also be multiple sensed conditions returning to a normal state depending on the number of sensed conditions selected in a particular implementation. For example, light sensor 192 may return to indicating that the system is in the light and motion sensor 193 may return to indicating that the system is no longer in motion. When decision block 440 finds that a wake up event has been encountered, then the system wakes up and full power operation is commenced as per block 445.

The system can also check for a third sensed condition at the election of the user. For example, if at decision block 430 motion is not sensed, a test is then performed at decision block 450 to determine if the user selected system orientation as a sensed condition. If the user did not select system orientation as a sensed condition, then process flow continues back to start block 300 and the process restarts. However, if the user did select system orientation as a sensed condition, then a test is conducted at decision block 455 to see if display down orientation is sensed. If the display down orientation is sensed, then in this particular embodiment both darkness and display down orientation are sensed conditions that are found to be present. Consequently, the system enters a reduced power standby state at block 435. If the display down orientation is not found, then process flow continues back to start block 300 and the process starts again.

The disclosed technology advantageously achieves significant power consumption reduction in portable systems which encounter usage states where the systems are not usable to the user.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in manner consistent with the scope of the embodiments disclosed herein.

What is claimed is:

1. A method of operating a portable information handling system (IHS) comprising:
  sensing a first condition to which the IHS is subjected in the course of operation to provide sensed information, wherein the first sensed condition is ambient light around the IHS;
  the IHS including a display;

subsequently sensing a plurality of conditions to provide additional sensed information including orientation of the display and motion of the IHS;

analyzing the sensed information to determine if the IHS is currently in an unusable state due to the first condition and one of the plurality of conditions being sensed; and entering a reduced power mode, by the IHS, if it is found that the IHS is currently in the unusable state.

2. The method of claim 1 wherein change in one sensed condition triggers wakeup of the IHS after the IHS has entered the reduced power mode.

3. The method of claim 1 wherein change in multiple sensed conditions triggers wakeup of the IHS after the portable IHS has entered the reduced power mode.

4. A method of operating a portable information handling system (IHS) comprising:

sensing first, second and third conditions to which the IHS is subjected in the course of operation to provide sensed information, wherein the first condition is ambient light around the IHS;

analyzing the sensed information to determine if the IHS is currently in an unusable state due to the first condition and any one of the second and third conditions being sensed; and entering a reduced power mode, by the IHS, if it is found that the IHS is currently in the unusable state.

5. The method of claim 4 wherein change in one sensed condition triggers wakeup of the IHS after the IHS has entered the reduced power mode.

6. The method of claim 4 wherein change in multiple sensed conditions triggers wakeup of the IHS after the IHS has entered the reduced power mode.

7. A portable information handling system (IHS) comprising:

a display coupled to the IHS;

a processor;

a plurality of condition sensors, coupled to the processor, for sensing conditions to which the IHS is subjected in the course of operation to provide sensed information, wherein a first one of the sensed conditions is ambient light around the IHS, a second one of the sensed conditions is motion of the IHS, and a third one of the sensed conditions is orientation of the display; and nonvolatile storage, coupled to the processor, for storing control software for analyzing the sensed information to determine if the portable IHS is currently in an unusable state due to the first condition and any one of the second and third conditions being sensed, and for causing the portable IHS to enter a reduced power mode if it is found that the portable IHS is currently in the unusable state.

* * * * *